Nov. 15, 1955  W. W. STEVENSON  2,723,563
SELF-DAMPING TURBINE ROTOR APPARATUS FOR FLUID METERS
Filed May 3, 1954  4 Sheets-Sheet 1
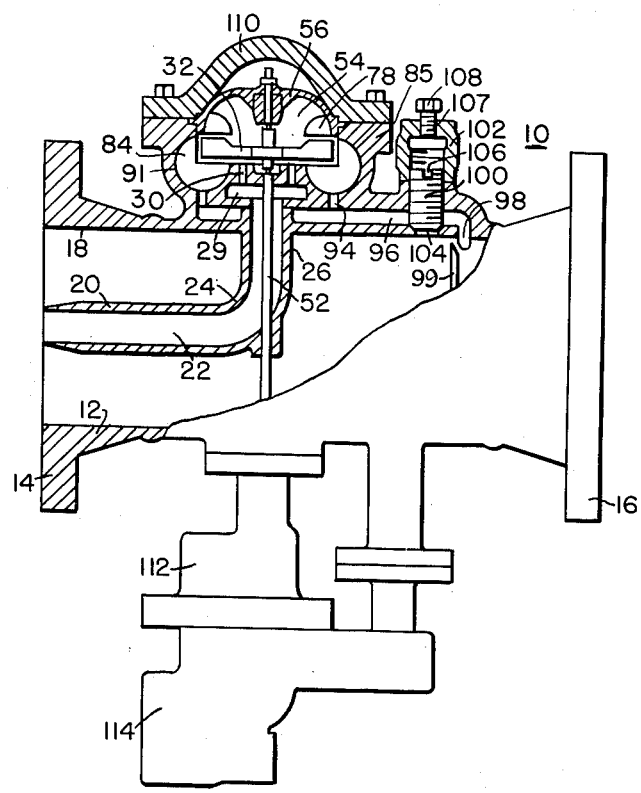
FIG. I.
INVENTOR.
WILBUR W. STEVENSON
BY
*Frederick Shapoe*

Nov. 15, 1955

W. W. STEVENSON 2,723,563

SELF-DAMPING TURBINE ROTOR APPARATUS FOR FLUID METERS

Filed May 3, 1954

*INVENTOR.*
WILBUR W. STEVENSON
BY
*Frederick Shapoe*

INVENTOR.
WILBUR W. STEVENSON
BY
*Frederick Shapoe*

United States Patent Office

2,723,563
Patented Nov. 15, 1955

2,723,563

SELF-DAMPING TURBINE ROTOR APPARATUS FOR FLUID METERS

Wilbur W. Stevenson, Pittsburgh, Pa.

Application May 3, 1954, Serial No. 427,089

5 Claims. (Cl. 73—231)

This invention relates to a self-damping turbine rotor apparatus particularly adapted for use in fluid meters for measuring the amount of a gaseous fluid, such as steam flowing through a conduit, and fluid meters embodying such rotor structures.

In the art of measuring the flow of gaseous fluids in a conduit, it is common to employ a turbine type rotor against which the gaseous fluid in the conduit, or a part thereof, is projected against the turbine rotor at a pressure or velocity proportioned to the rate of flow of the gaseous fluid in the conduit. These turbine rotors are constructed and arranged in fine bearings having low friction, so that they spin easily even with the lightest of puffs of the gaseous fluid. The turbine rotors are connected to a reduction gear train to operate some form of easily operated indicator or register. Consequently, the load on the turbine rotor is practically negligible so that it would tend to overspeed readily and to race away at a speed where it would destroy itself. Therefore, some damping means has been universally applied to the rotors in order to apply a load as closely proportional to its velocity as is reasonably possible. To accomplish damping, the turbine rotor shaft, in many instances, is affixed to a paddle wheel running in a body of water or other liquid. The load imposed on the turbine shaft by such water damping expedient is related to the velocity of the turbine. However, the load is not always uniformly proportional to the velocity of the shaft, but departs non-uniformly from a straight line relationship thereto, due to changes in temperature and viscosity. Consequently, there are irregularities in the turbine velocity curve if plotted against flow of the gaseous fluid.

Suitable adjustments are usually made in the design of a turbine rotor, so that it is rated for use over a specified limited range of steam flow, for example, in a conduit. Within this specified range, the turbine rotor velocity ordinarily is lower than it should be at the minimum steam flow rate, and increases faster than the flow increases. In many localities, it is required by law that a fluid meter be accurate within plus or minus 4%. In order to comply with this legal requirement, a given steam meter can be used only over a limited range of steam flow. This necessitates the manufacture and use of a great number of different steam meters. Even so, during a good part of the time, the register of a steam meter is appreciably inaccurate, often by as much as 3% and more. Over long periods of time, the cumulative error will amount to substantial quantities of steam.

Furthermore, it would be highly desirable to provide for a turbine rotor that is free of external damping means. Thus, water used for damping will freeze in cold weather, or escape by evaporation, leakage or otherwise, and considerable meter errors will often arise before the defect is discovered.

An object of the invention is to provide a self-damping turbine rotor capable of functioning with great accuracy over a wide range of velocities of gaseous fluid.

Another object of the invention is to provide a self-damping turbine rotor operable by gaseous fluids and so constructed that there is a highly accurate correlation between the turns of the rotor to the volume of gaseous fluid passing therethrough.

A further object of the invention is to provide a meter for measuring the amount of gaseous fluid passing through a conduit, the meter being provided with a self-damping turbine rotor capable of registering with great accuracy the amount of gaseous fluid passing through the conduit.

Other objects of the invention will, in part, be obvious and will, in part, appear hereinafter.

For a better understanding of the nature and objects of the invention, reference should be had to the following detailed description and drawings, in which:

Figure 1 is a view in elevation partly in section of a complete meter;

Figure 3:
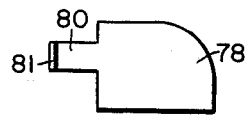
Fig. 3 is a view in elevation of an upper fluid directing and damping vane.

Referring to Fig. 1 of the drawings, there is illustrated a two-range meter 10 provided with a novel self-damping turbine type rotor of the present invention. Many of the details of the two-range meter are disclosed in my copending application Serial No. 356,992, filed May 25, 1953, and reference is hereby made thereto for such details as are not specifically covered herein.

The meter 10 comprises a conduit 12 adapted to be fitted within a line carrying gaseous fluid whose quantity is to be measured. The conduit 12 is provided with flanges 14 and 16 to provide for connecting the meter into such line. In general, the inner wall 18 of the conduit 12 will usually have the same diameter as the line in which the meter 10 is to be fitted, although it will be understood that there may be differences in diameters. Projecting upstream within the conduit 12 is a pitot type tube 20 having an inner channel 22 for conveying a small part of the gaseous fluid passing through the conduit to a turbine rotor. The tube 20 is provided with an elbow 24 and a length 26 affixed to and passing through the wall of the conduit 12.

Figure 2:
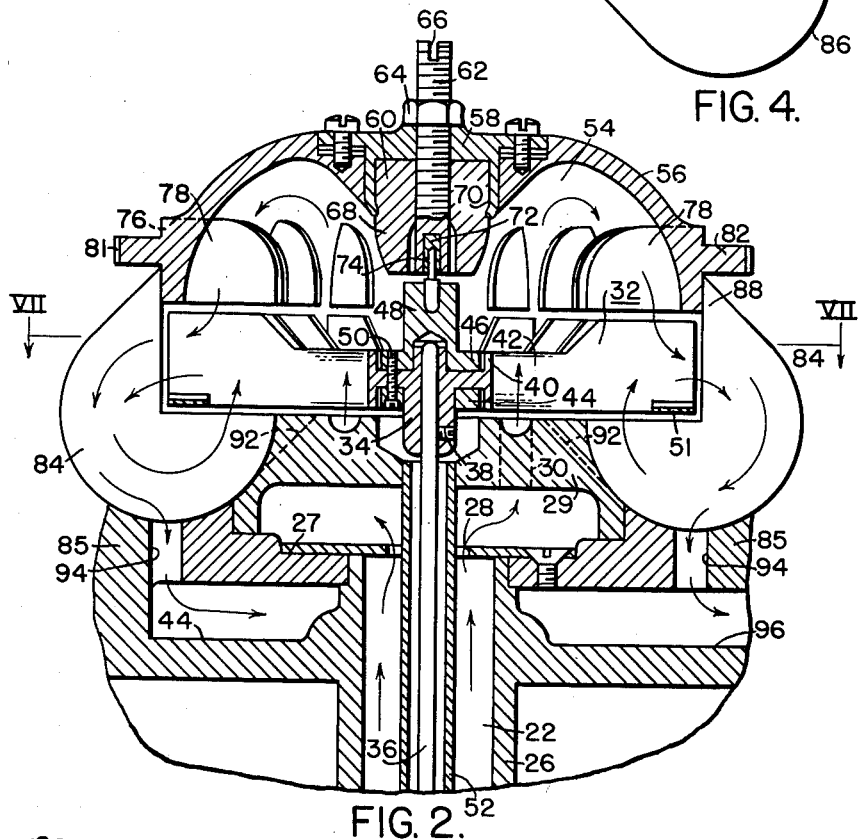
Fig. 2 is an enlarged fragmentary cross-section through the self-damping rotor of Fig. 1.

Reference should now be had to Fig. 2 of the drawings, wherein the arrangement of the parts of the meter mechanism and the action thereon of the fluid conveyed by the channel 22 is more evident. The gaseous fluid passes upwardly within the conduit 26 until it reaches an orifice plate 27 provided with a suitable orifice 28 adapted to compensate for the particular gaseous fluid and the pressures at which it is being flowed through the conduit 12. Thus, for a high density fluid moving at a substantial velocity, the orifice 28 will be relatively small. On the other hand, for measuring the flow of a gas, such as hydrogen or natural gas flowing at pressures of the order of inches of water, the orifice 28 will be substantially of the full size of channel 22. After passing through the orifice 28, the gaseous fluid enters a chamber defined between the orifice plate 27 and a nozzle plate 29. The nozzle plate 29 is provided with a plurality of nozzles 30 passing therethrough at an angle to direct the flow of the gaseous fluid against a turbine type rotor 32.

Figure 6:
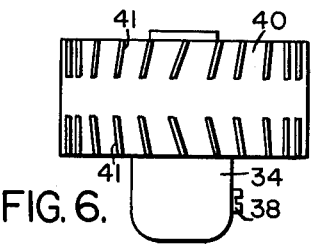
Fig. 6 is a view in elevation of the hub of the turbine rotor.

The rotor 32 comprises a central hub 34 mounted on the upper end of a slender shaft 36, the hub being rigidly affixed to the shaft 36 by a set screw 38. The hub comprises a rim portion 40 provided with slots 41. Into the slots 41 of rim portion 40 are fitted bendable tabs of a plurality of rotor blades 42. An enlarged view of the hub portion 34 is shown in Fig. 6. The tabs of the blades 42 are bent flat against the inner wall of the rim 40 and are locked in place to prevent them from accidentally escaping therefrom by a lower blade clamping ring 44 and a flange 46 of an upper bearing 48. One or more screws 50 are threadedly passed through the clamping ring 44 and the flange 46 in order to maintain them in assembled position. At the periphery of the blades 42 is a circular shroud ring 51 to which the outer extremities of the blades are fastened, for example, by soldering, welding, or the like.

An enclosing support member 56 is disposed above the rotor 32 to provide a toroidal chamber 54 in the shape of a volume of revolution. The chamber 54 has upper curved walls which rise in a relatively smooth curve from a low point near the axis of the rotor to a high point approximately halfway to the periphery and then down to a low point at about the periphery of the rotor. The support member 56 is provided with a central holder 58 carrying a magnetic member 60. Passing through the magnetic member 60 is a threaded screw 62 provided with a lock-nut 64 and a slot 66 enabling the screw to be adjusted in any desired vertical position. The lower end 68 of the magnet is constructed by slitting and suitable magnetization to provide for north and south magnetic poles at the bottom thereof. The bearing member 48 is constructed of iron or other readily magnetizable material which will be strongly attracted by the magnet end 68 whereby to suspend the entire rotor 32. The magnet is retained in place by suitable prongs 70 constructed in a cup-like portion of the member 56, the prongs coacting with indentations within the body of the magnet 60. The screw 62 is provided with a cavity at its lowermost portion fitted with a jewel bearing 72 adapted to maintain a pivot bearing 74 affixed to the upper end of the bearing member 48. The coaction of the jewel 72 and pivot 74 fixes the axis of rotation of the rotor 32, as well as preventing the bearing member 48 from being drawn into actual contact with the magnet end 68. Suitable adjustments of the screw 62 will enable the magnet to support the desired proportion of the total weight of the rotor.

The periphery of the cover member 56 at its lower portion is provided with a plurality of slots 76 into which are fitted a plurality of upper fluid directing and damping vanes 78. When gaseous fluid passing through the nozzles 30 impinges on blades 42, it maintains a considerable amount of angular velocity, and upon contacting the walls of the cover member 56, the gaseous fluid is directed outwardly and downwardly toward the vanes 78 which absorb some of the energy of the gaseous fluid and direct the gaseous fluid downwardly. The gaseous fluid then comes in contact with the outer periphery of the blades 42 which are traveling at a considerably different velocity than is the gaseous fluid. The blades are so affected that the gaseous fluid imparts thereto a retarding force.

Disposed about and below the entire periphery of the rotor 32 are a plurality of lower damping baffle vanes 84. Gaseous fluid previously directed by vanes 78 into the rotor tends to be projected off the periphery of the blades 42 and both downwardly and outwardly into contact with the vanes 84. It will be noted that the baffle vanes 84 are disposed within a chamber having a cross-section of three-quarters of a circle, the center of such circle being close to the lower edge of the extreme periphery of the rotor 32. As will be noted by reference to Figures 1 and 2, the vanes 84 are disposed in a plurality of slots cut within the body 85 of the meter.

Figure 4:
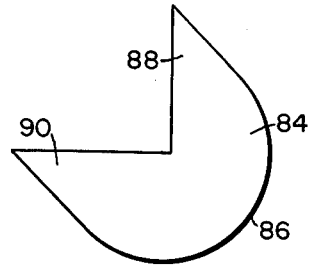
Fig. 4 is a view in elevation of a lower damping vane or baffle.

Reference should be had to the Figures 3 and 4 for details of the construction of the upper and lower baffle vanes. Each of the baffle vanes 78 is provided with a projection 80 which corresponds to a flange 82 of the cover member 56. The extreme end of the projection 80 is provided with a right-angle bent portion which locates each baffle 78 properly in the cover member 56. It will be understood that the baffle 78 will fit firmly into the slots 76, so that they may be readily pushed in with a little force into proper position, and when the entire set of baffle 78 have been put into the cover member 56, it may be lifted and inserted into the body 85 to take the position shown in Figure 1.

The lower baffle vanes 84 comprise a rounded outer end 86 from which project two pointed extremities 88 and 90. The nozzle plate 29 is machined to provide a plurality of slots 92, as shown in Figure 2 of the drawings, into which the projections 90 are adapted to be fitted. The rounded portion 86 fits into a toroidal chamber 91 provided in the body 85, slots being provided in the body to enable the vanes 84 to be introduced into the chamber 91. The vanes 84, when disposed as shown in the drawings, form a plurality of pockets in which gaseous fluid may enter and circulate, for example, clockwise, and is projected from the lower portion thereof against the periphery of the blades 42. Due to the considerable difference in the velocity of the rotor 32 and the speed and direction of flow of the gaseous fluid circulating within these pockets, the gaseous fluid progressively imparts braking energy to the rotor and loses heat energy with repeated circulation past the vanes 84 and peripheral tips of the blades 42, so that its velocity is progressively changed and reduced. The retarding energy of the gaseous fluid imparted to the periphery of the blades is exactly proportional to the driving energy imparted earlier to the rotor. Finally, the spent gaseous fluid, as well as any condensate, enters escape ports 94 disposed about the lower portion of chamber 91 and passes through the member 85 and into a vent chamber 96.

Gaseous fluid in the vent chamber 96 will pass to a slot 98 back into the outlet or downstream end of the conduit 12. A threaded regulating screw 100 is disposed within a threaded projection 102 of the meter body, to cooperate in providing a desired closure relationship with an auxiliary port 104. The upper part of the threaded projection 102 is rotatably mounted on screw 100 so that it may be locked with a wrench to prevent tampering. By suitably raising the screw 100 upward or downward by turning it with a screw driver in slot 106, more or less of the gaseous fluid may be vented through the port 104. Consequently, the amount escaping through the slot 98 is, correspondingly, changed. The projection 102 is provided with an opening 107 through which a screw driver may be inserted to rotate the screw 100. Ordinarily, the opening 107 is closed with a threaded bolt 108.

A movable baffle 99 is shown in Figure 1 in the fully closed position so that most of the steam flow passes through tube 22 and thence through slot 98 downstream of the baffle. Reference should be had to my copending application Serial No. 356,992 for a full description of the baffle 99 and its mode of operation.

The assembly of rotor 32 and closure member 56 is maintained in position by a suitable cap 110 that is connected to body 85 by bolts.

The shaft 36 is disposed within a protective tube 52 which is in tight sealing engagement at its upper end with the nozzle plate 29. The shaft 36 is adapted to engage a suitable magnetically operable integrating mechanism disposed in the chamber 112 which, in turn, is connected with a suitable register 114, both of the latter may be constructed as shown in detail in my copending application Serial No. 356,992. It will be understood that there are numerous other types of mechanism for connecting the rotor to a register mechanism in order to integrate the revolutions of the meter in terms of the amount of gaseous fluid passing through the conduit 12.

Figure 5:
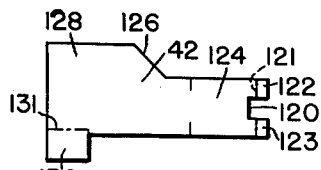
Fig. 5 is a view in elevation of a rotor blade.

Each of the rotor blades 42 may be prepared by stamping out, or otherwise forming a blank, as shown in Fig. 5 of the drawings. The stamping is provided with a slot 120 between two tabs 122 and 123 adapted to fit within the slots 41 of the rotor hub 34. When the tabs 122 and 123 are inserted into the slots 41, they may be then bent substantially at right angles, thereby locking them in place. The tabs are creased at the dotted line 121 when bent back. The blade 42 comprises a driving surface 124 immediately adjacent the tabs 122—123. It will be understood that the driving surface may be flat, if desired, though it is preferable that it be curved. If the slots 41 are cut at an angle to the vertical axis of the rotor, as indicated in Fig. 6 of the drawings, the driving surface 124 will naturally be rendered concave. It will be understood that the surface 124 may be subjected to a stamping or forming operation which will suitably curve it to a satisfactorily smooth concave surface, the tabs 122 and 123 being aligned to slip into the slots 41. The blade 42 is so constructed that toward its outer periphery the upper edge 126 inclines upwardly to produce an enlarged paddle portion 128. It will be understood that the edge of the blade may be composed of rounded corners or curved or otherwise constructed to meet requirements and the illustration of Fig. 5 is just one possible structural embodiment. Depending from the lower end of the extreme outer edge of the blade 42 is a flange 130 which is bent upwardly at the dotted line 131. The flange 130 may be soldered, welded, or otherwise affixed to the peripheral shroud ring 51.

Figure 7:
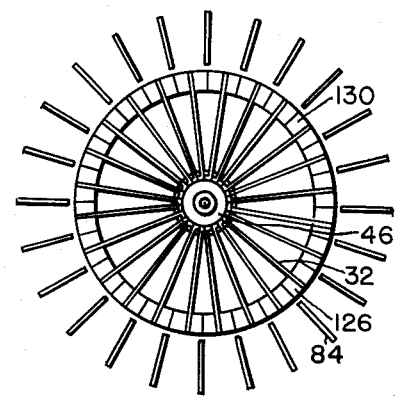
Fig. 7 is an upper plan view of the rotor and damping baffle along line VII—VII of Fig. 2.

A top plan view of the rotor and the lower deflecting vanes is shown in Fig. 7 of the drawings. It will be evident that the construction of the rotor 32 is simple yet rugged and extremely durable. While the rotor has been shown as composed of a particular construction and arrangement, it will be understood that the entire rotor may be cast as one unit by precision casting methods, and no portion thereof may be removed or adjusted as is the construction illustrated herein. Furthermore, the rotor blades may be soldered or welded to the exterior of a smooth hub or by such other construction as will be evident to those skilled in the art.

It is to be understood that the rotor need have essentially only a driving portion adjacent the center of rotation thereof and a peripheral dampening portion at the extremities thereof.

Figure 8:
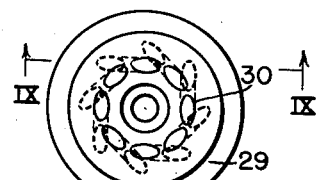
Fig. 8 is an upper plan view of a nozzle plate for directing gaseous fluid to the turbine rotor.
Figure 9:
Fig. 9 is a fragmentary view in elevation of nozzle and rotor along line IX—IX of Fig. 8.

Referring to Figs. 8 and 9, there is shown additional details of the nozzle plate, in order that it may be more clear as to its construction. It will be noted that the nozzles 30 are disposed at an angle to project steam or other gas against the concaved blades 42 of the rotor. It will be appreciated that the shape of the nozzles 30 may be modified to suit requirements. I have found that cylindrical nozzles of the same diameter throughout are quite satisfactory. Furthermore, the number of the nozzles 30 may be greater or less than shown, depending upon the requirements of the particular metering application. Thus, in some cases, a double series of nozzles may be employed in a single nozzle plate 29.

Figure 10:
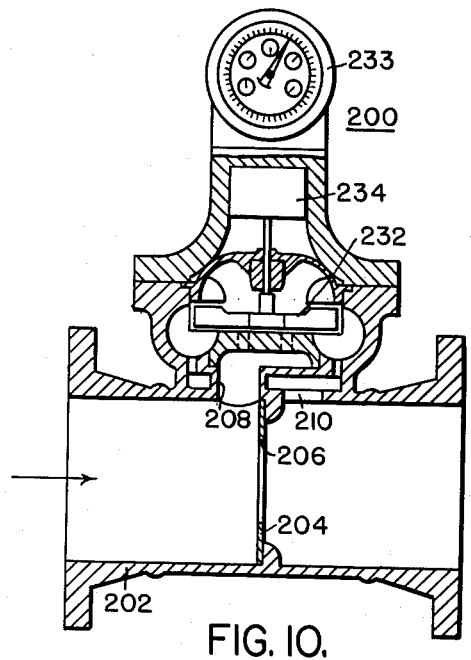
Fig. 10 is a vertical cross-section through a modified form of fluid meter employing a restricted orifice.

It is not necessary that the turbine rotor of this invention be employed with the specific meter shown in Fig. 1 of the drawings. Thus, my novel rotor construction may be employed in the well known orifice-plate type of single stage meter 200, as shown in Fig. 10 of the drawings. The orifice-plate meter 200 comprises a conduit 202 within which is fitted a suitable orifice plate 204 comprising a restricted opening 206. Gaseous fluid entering the conduit 202 from the left-hand end, as shown by the arrow, builds up a back pressure within a lateral inlet 208 through which a portion of the gaseous fluid passes to operate the rotor 232, whose details are similar to those shown in Figs. 1 and 2 of the drawings. At the right-hand or downstream portion of the conduit beyond the orifice plate 204, there will be a lower pressure within the outlet 210 than there is at the lateral inlet 208. The differential pressures between inlet 208 and outlet 210 will constitute the driving force on the rotor 232. This meter operates its integrating counter 233 through a set of speed-reducing gears contained within a gear box 234.

Figure 11:
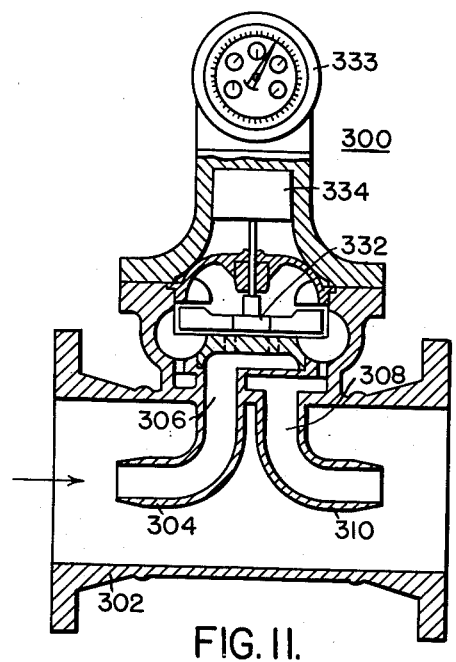
Fig. 11 is a vertical cross-section through a further modification of the meter.

In Fig. 11, there is illustrated a further modification of meter comprising a conduit 302 into which gaseous fluid flows from the left-hand side, as indicated by the arrow. A portion of the gaseous fluid is intercepted by the flow tube 304 and conveyed through the channel 306 to the turbine rotor 332 which transmits motion to a gear box 334 and thence to an integrating counter 333, and is, otherwise, similar to that shown in Fig. 2 of the drawings. Exhausted gaseous fluid vented from the meter enters a channel 308 and is ejected therefrom through a tube 310 so arranged that the flow of gaseous fluid through the conduit 302 creates a reduced pressure therein. In the construction shown in Fig. 11 of the drawings, there are advantages arising by reason of the greater differences in pressures between 306 and 310 than are present in the construction of Fig. 10, because tube 310 produces a negative differential pressure similar to and combined with the positive differential pressure produced by tube 304.

Figure 12:
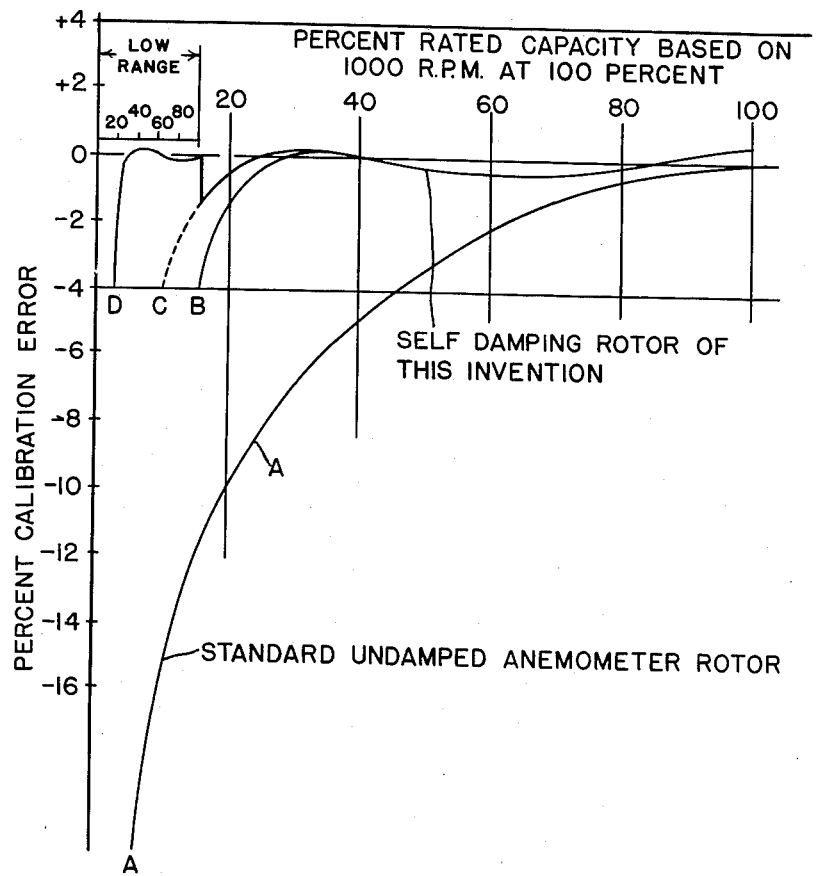
Fig. 12 is a graph plotting flow of gaseous fluid in terms of percentage of maximum capacity of the meter against per cent error using various rotors, as well as the rotor of the present invention.

Referring to Fig. 12 of the drawings, there are plotted curves developed from tests run on the rotor of the present invention. The curve A is the characteristic calibration curve of a free turning undamped rotor of an anemometer. This calibration curve is in terms of the calibration error against rated capacity of a given flow of gas through a given conduit. Using a two-stage gaseous fluid meter, shown in Fig. 1 and in my copending application Serial No. 356,992, the curve B is the deviation of the reading of the meter using one rotor constructed by me in accordance with this invention, and operating within the high range of meter, wherein a baffle 99 in the conduit 12 is in the wide-open position. As will be noted, the reading is within plus or minus 1% over the range of from approximately 25% to 100% of the capacity of the meter. It was desired to operate this meter such that the rotor 32 did not operate above 1000 R. P. M., lest it be damaged by excessive speeding. It will be noted that the accuracy of the meter drops somewhat in the range of 15% to 25%, although it is still within the plus or minus 4% error range allowed by law in certain states. In a refined form of rotor of this invention, the calibration curve is shown by the curve C, and it will be apparent it is substantially within the 1% error range from 15% to 100% of its capacity. The curve D is the calibration curve of the meter of Fig. 1 with the damping baffle at its closed position, whereby the meter operates within the so-called low range. It will be noted that the error within this low range is less than 2% within 20% to 100% of the low range, or from 3% to 15% of the full capacity of the meter. In other words, the readings on the meter of the present invention applied in a two-stage meter construction, as set forth in my copending application and the construction of Fig. 1, is within an accuracy of better than 2% throughout the range from 3% to 100% of its full capacity. Below 3% of the full gas flow, its error increases rapidly. However, it will be understood that at such low flows of gaseous fluid, this error is negligible in any event.

It will be understood that the above description and drawings are exemplary and not in limitation of the in-

I claim as my invention:

1. In apparatus having a self-damping turbine rotor for operation by a gaseous fluid, in combination, walls forming a chamber in the shape of a volume of revolution, a turbine rotor pivotally mounted along the axis of the volume of revolution, the turbine rotor comprising a plurality of blades radially extending from the pivotal mounting thereof, means for introducing jets of the gaseous fluid in a generally axial direction near the root of the blades whereby the rotor may be set in motion, the walls of the chamber facing the jets of gaseous fluid escaping from the blades being curved so as to deflect the jets of the gaseous fluid back toward the periphery of the blades, a first set of deflecting vanes disposed to direct the deflected jets of gaseous fluid to impinge on the periphery of the blades whereby to damp the rotor, the chamber including a toroidal portion of substantially circular cross-section disposed immediately around the periphery of the rotor to receive the deflected jets after impingement thereof on the periphery of the blades, a plurality of deflecting baffle vanes fixed in the toroidal portion to redirect the gaseous jets back into the periphery of the blades to further damp the rotor, and the walls of the toroidal portion having openings forming exhaust ports leading from the toroidal portion to vent spent gaseous fluid from the chamber.

2. In apparatus having a self-damping turbine type rotor for operation by a gaseous fluid, in combination, walls forming a chamber in the form of a volume of revolution, a turbine rotor mounted on a shaft disposed along the axis of the volume of revolution, the rotor comprising a plurality of blades extending radially from the shaft, the chamber having a relatively flat lower face disposed closely below the root portion of the blades, the flat face having openings forming nozzle ports to direct jets of gaseous fluid upwardly against the root portion of the blades, the upper part of the chamber having a curved, dome-shaped cross-section extending from the shaft to a point at approximately the periphery of the rotor blades whereby to direct the jets of gaseous fluid leaving the root portion of the blades to the periphery of the blades, a first set of upper deflecting vanes fixed to the walls of the chamber above the periphery of the rotor blades to assist in directing the jets of gaseous fluid whereby to partly damp the motion of the rotor, the chamber including a toroidal portion disposed beyond and below the periphery of the blades, the toroidal portion having a cross-section of substantially three-quarters of a full circle, the radius of said circle being approximately that of the height of the blades at the periphery, a plurality of deflecting vanes located in the toroidal portion to form circular pockets whereby to cause the gaseous fluid therein to move along the circular walls of the pockets and not to follow the rotor thereby effecting a high degree of damping, and the walls at the bottom of the circular pockets having exhaust ports to enable spent gaseous fluid and condensate to escape.

3. In apparatus having a self-damping turbine type rotor for operation by a gaseous fluid, in combination, walls forming a chamber, a bladed rotor disposed for rotation in the chamber, means for directing streams of gaseous fluid on the rotor blades to cause rotation of the rotor, the walls of the chamber redirecting the partly spent streams of the gaseous fluid against the blades to damp the rotor motion, deflecting vanes disposed to assist in the redirecting of the streams of gaseous fluid, the walls forming a toroidal chamber at the periphery of the rotor to further receive the gaseous fluid, deflecting vanes in the toroidal chamber to assist in deflecting the streams of gaseous fluid into the periphery of the rotor to damp the rotor motion further, and the walls of the toroidal chamber having exhaust ports to vent spent gaseous fluid therefrom.

4. In a meter for determining with great accuracy the amount of gaseous fluid passing through a conduit, in combination, walls forming a chamber, a self-damping rotor disposed for rotation in the chamber, means for directing a portion of the gaseous fluid from the conduit to the self-damping rotor, the rotor comprising a magnetizable hub portion mounted on a shaft, a plurality of radially extending rotor blades affixed to the hub, the gaseous fluid being directed against the root portion of the blades whereby to cause the rotor to revolve and thereby expend a part of its energy, the walls forming the chamber having upper walls curved first, upwardly from the magnetizable hub portion and then downwardly toward the periphery of the rotor blades whereby to redirect partly spent gaseous fluid against the periphery of the rotor blades to cause partial damping thereof, a relatively fixed permanent magnet mounted in the upper part of the chamber and disposed above the magnetizable hub portion to support the weight of the rotor by attraction therebetween, deflection vanes being disposed in the downwardly curved portion of the walls above the rotor in order to facilitate damping, the rotor chamber including a toroidal portion circumscribing the periphery of the rotor, the toroidal portion having a cross-section of three-quarters of a circle, the rotor blade periphery sweeping through the remaining quarter of the circle, the toroidal portion having its circumferential axis substantially at the extreme lower end of the rotor periphery, a plurality of baffle vanes disposed within the toroidal portion to prevent gas flow along the circumferential axis and serving to redeflect the gaseous fluid repeatedly in circular motion against the periphery of the blades to enable full damping, and the lower part of the toroidal portion having openings forming exhaust openings to vent fully spent gaseous fluid.

5. In a gaseous fluid meter having a self-damping turbine rotor, walls forming a chamber in the shape of a volume of revolution wherein the upper walls rise from a low point near the axis thereof in a relatively smooth curve to a high point located approximately half-way from the axis to the outer periphery of the chamber and then descend to the periphery, a turbine rotor mounted at the axis of the volume of revolution, the rotor comprising a plurality of blades having a driving portion adjacent the axis of revolution and a damping portion at the periphery of the rotor, the periphery of the rotor being close to the periphery of the chamber, means for projecting gaseous fluid against the driving portion of the blades, the gaseous fluid after projection against the driving portion escaping and striking the rising portion of the upper walls of the chamber and following the curve of the walls being redirected against the damping portion of the blades, a plurality of fixed vanes disposed about the periphery of the rotor so as to redirect the gaseous fluid repeatedly against the damping portion of the blades, and walls forming a toroidal chamber about and adjacent to the periphery of the rotor, a part of the fixed vanes being disposed in the toroidal chamber to subdivide it into pockets in which the gaseous fluid may enter and be redirected against the damping portion of the rotor blades, whereby the rotor is damped.

References Cited in the file of this patent

UNITED STATES PATENTS

| | | |
|---|---|---|
| 282,985 | Hesse | Aug. 14, 1883 |
| 1,020,127 | Coleman | Mar. 12, 1912 |
| 2,449,973 | Bergman | Sept. 28, 1948 |
| 2,574,198 | Stevenson | Nov. 6, 1951 |